United States Patent
Utley et al.

(10) Patent No.: US 12,451,553 B2
(45) Date of Patent: Oct. 21, 2025

(54) ASYMMETRIC AND SYMMETRIC ELECTROCHEMICAL ARRAYS

(71) Applicant: FORD GLOBAL TECHNOLOGIES, LLC, Dearborn, MI (US)

(72) Inventors: Brian Utley, Canton, MI (US); Daewon Han, New Hudson, MI (US); Mary Fredrick, Carleton, MI (US); Chi Paik, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 617 days.

(21) Appl. No.: 17/880,243

(22) Filed: Aug. 3, 2022

(65) Prior Publication Data

US 2024/0047812 A1   Feb. 8, 2024

(51) Int. Cl.
*H01M 50/267*   (2021.01)
*H01M 10/0525*   (2010.01)
*H01M 50/204*   (2021.01)

(52) U.S. Cl.
CPC ..... *H01M 50/267* (2021.01); *H01M 10/0525* (2013.01); *H01M 50/204* (2021.01); *H01M 2220/20* (2013.01)

(58) Field of Classification Search
None
See application file for complete search history.

(56) References Cited

U.S. PATENT DOCUMENTS

| | | |
|---|---|---|
| 8,859,131 B2 | 10/2014 | Kim et al. |
| 9,627,708 B2 | 4/2017 | Kwon et al. |
| 2014/0162108 A1 | 6/2014 | Visco et al. |
| 2017/0214031 A1* | 7/2017 | Lee ............... H01M 10/058 |
| 2019/0115614 A1* | 4/2019 | Sakurai ......... H01M 10/0486 |

FOREIGN PATENT DOCUMENTS

CN   105584345 B   8/2020

* cited by examiner

*Primary Examiner* — Wyatt P McConnell
(74) *Attorney, Agent, or Firm* — David B Kelley; Brooks Kushman P.C.

(57) ABSTRACT

Electrochemical cell arrays such as battery packs having cells of different sizes and/or thicknesses is disclosed. For example, the cells in an array may progressively increase or decrease in size or thickness from a first end to a second end such that a gradient in thickness is created. Alternatively, the gradient may be from the center to the outside. In a variation, the first and second endplates may be of different sizes or thicknesses.

16 Claims, 4 Drawing Sheets

ASYMMETRIC AND SYMMETRIC ELECTROCHEMICAL ARRAYS

TECHNICAL FIELD

The instant disclosure relates to electrochemical cell arrays such as lithium-ion batteries and more specifically, arrays having various electrochemical cells of different sizes and/or thicknesses.

BACKGROUND

Electrochemical cells such as batteries are a primary method of storing energy. For example, many devices including electric vehicles (EVs) and hybrid electric vehicles (HEVs) may use batteries such as lithium-ion batteries. The high energy demands of these applications are met by larger assemblies. But larger assemblies may raise new challenges.

SUMMARY

An electrochemical cell array is disclosed. The array includes a plurality of electrochemical cells and a plurality of interconnects therebetween. The interconnects provide electrical communication among the plurality of cells. The plurality of cells may include a first electrochemical cell having a first size and/or thickness and a second electrochemical cell having a second size and/or thickness. The first and second thicknesses being different.

The first cell may be a first outer cell and the second cell may be a second outer cell. Alternatively, the first cell may be an outer cell and the second cell may be an inner cell. In a variation, the first thickness may be greater than the second thickness. In another variation, the first thickness may be less than the second thickness. In a refinement, the plurality of electrochemical cells may be arranged in series. In one or more embodiments, the plurality of cells may include at least 40 cells, or more preferably at least 50 cells, or even more preferably at least 55 cells. In a variation, the cells may include a lithium-ion battery.

An electrochemical cell array is disclosed. The cell array may include a first endplate a second endplate, and a plurality of electrochemical cells disposed between the first and second endplates. The cells may include a first cell having a first thickness, a second cell having a second thickness, and a third cell having a third thickness. The first and second thicknesses may be different.

In a variation, the plurality of cells may define a first end, center, and a second end. The first cell may be disposed at the first end, the second cell may be disposed at the center, and the third cell may be disposed at the second end. In a refinement, the third thickness may be different than the first thickness and the second thickness. For example, the plurality of electrochemical cells may form an asymmetric thickness gradient from intermittently progressing from the first end to the second end. In another refinement, the first and third thicknesses may be the same such that the plurality of cells forms a symmetry with a first thickness gradient from the first end to the center and a second thickness gradient from the center to the second end. In a variation, the second thickness is greater than the first and third thicknesses. In another variation, the second thickness is a less than the first and third thicknesses. In yet another refinement, the first endplate may have a first endplate thickness and the second endplate may have a second endplate thickness. The first and second endplate thicknesses may be different.

A vehicle power system is also disclosed. The power system may include a plurality of battery packs such as lithium-ion battery packs. Each battery pack may include a plurality of batteries and at least one of the battery packs may include a first battery defining a first thickness and a second battery defining a second thickness. The first and second thicknesses may be different.

DETAILED DESCRIPTION

Figure 1:
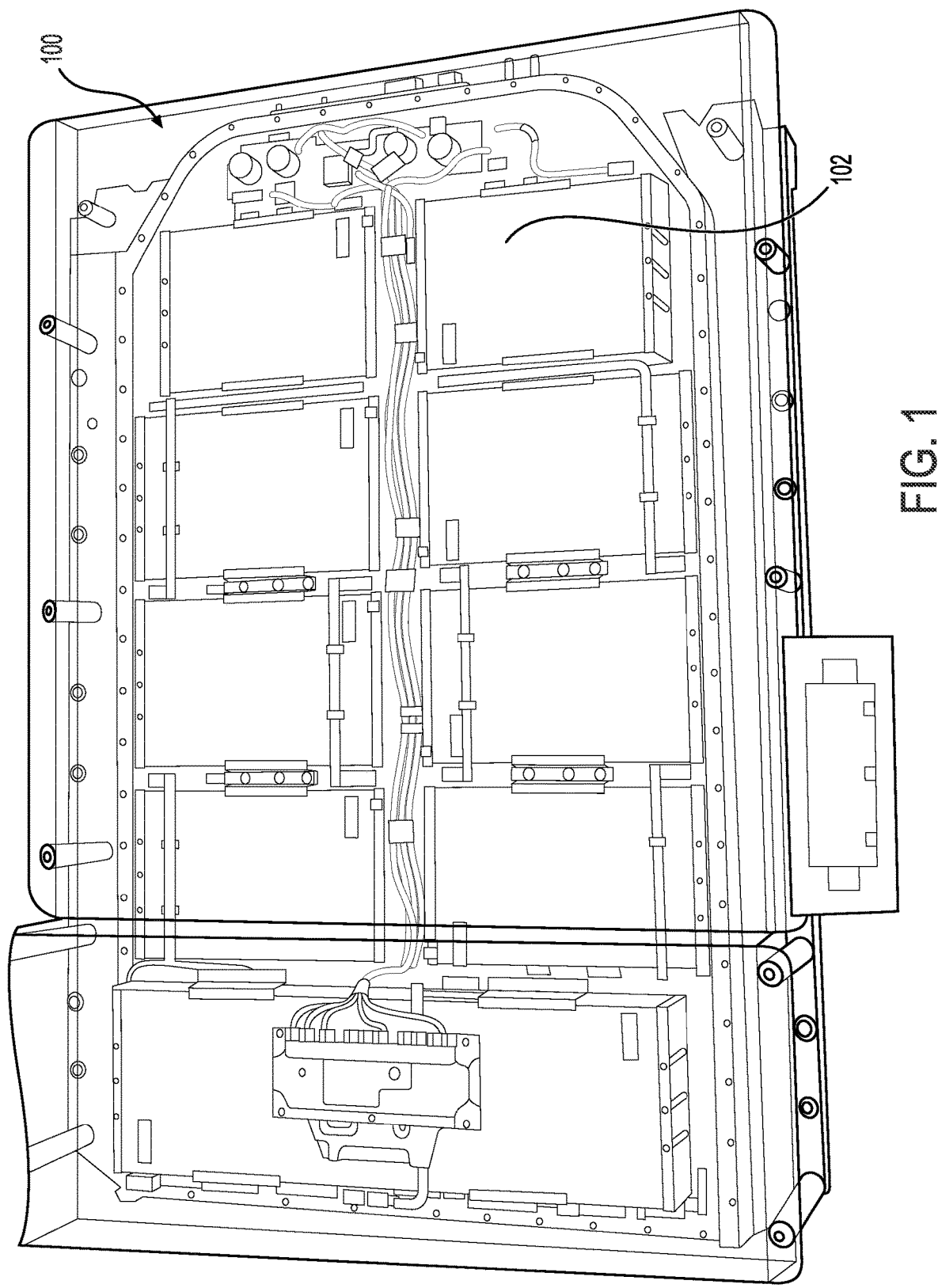
FIG. 1 is a power system such as for a vehicle include an electrochemical array.

Embodiments of the present disclosure are described herein. It is to be understood, however, that the disclosed embodiments are merely examples and other embodiments can take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Moreover, except where otherwise expressly indicated, all numerical quantities in this disclosure are to be understood as modified by the word "about" in describing the broader scope of this disclosure. Practice within the numerical limits stated is generally preferred. A description of constituents in chemical terms refers to the constituents at the time of addition to any combination specified in the description and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Figure 7:
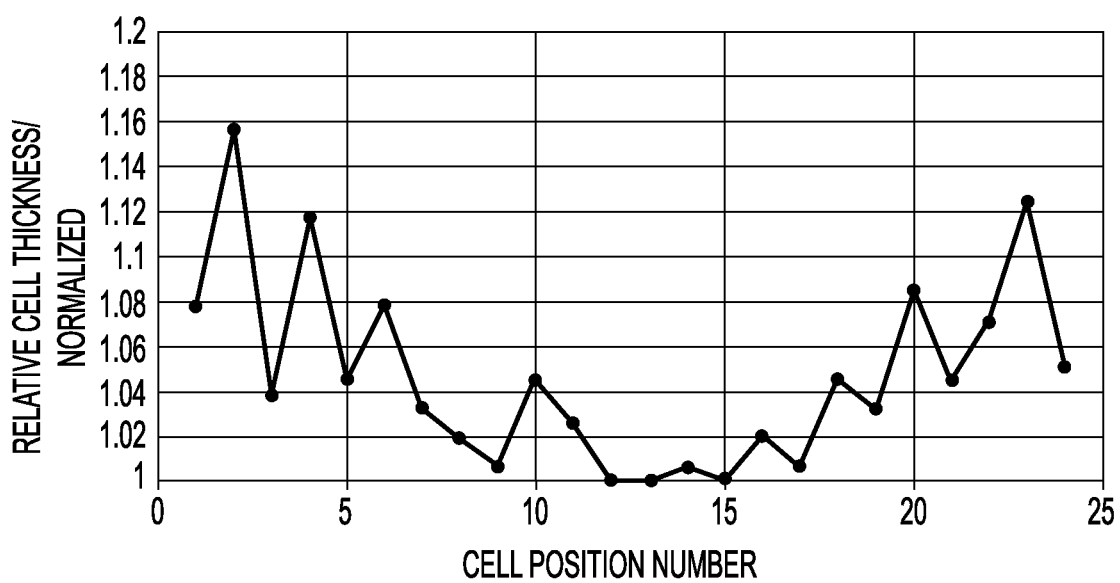
FIG. 7 is a chart illustrating the effects of stress testing on a conventional 24-cell array.

Electrochemical cells are often arranged together to in an array 102, as shown in FIG. 1, to provide greater power and meet higher energy demands. For example, cells may be arranged in an array (i.e., battery pack) and multiple arrays may be assembled into a power system of electric device such as an EV or a HEV. However, cells in the array 102 may experience different operating conditions which create challenges. For example, cells in the center may operate at a higher temperature, cool down slower, and/or experience greater compression pressure due to expansion and/or swelling. For example, FIG. 7 illustrates thicknesses associated with expansion or swelling of a conventional 24-cell array after a stress test. The thickness can also be associated with greater pressure because the original cells of the arrays were of the same size prior to expansion and/or swelling. FIG. 7 illustrates that cells at the ends or proximate the ends of the arrays may expand or swell to about 12 to 16% their original thickness. Accordingly, and unless otherwise stated the thicknesses described hereinafter may refer to thicknesses prior to operation or stress that causes expansion and/or swelling.

Vehicles may include but are not limited to automobiles, motorcycles, watercrafts, rail transports, aircraft, and/or spacecrafts. Electric vehicles may be primarily propelled by energy stored in and/or generated by electrochemical cells such as batteries (e.g., lithium-ion batteries) or fuel cells. Hybrid electric vehicles may be propelled by either energy from electrochemical cells or fossil fuels (e.g., combustion).

These differences and/or challenges may be exacerbated as the array increases in size and the number of cells increases. In one or more embodiments, the array 102 may consist of at least cells, or more preferably at least 50 cells, or even more preferably at least 55 cells. For example, the array 102 may include 40 to 100 cells, or more preferably 50 to 80, or even more preferably 55 to 65. The cells may be in electrical communication with each other by one or more interconnects (e.g., a plurality of interconnects). The cells may be arranged in series and/or parallel. In a refinement, the cells may be arranged in series. In a variation, the cells may be lithium-ion batteries.

Figure 2:
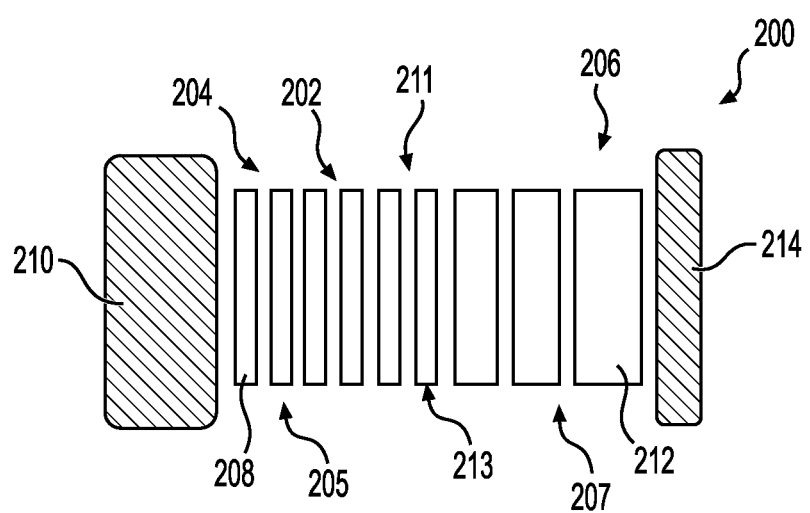
FIGS. 2-5 are variations of electrochemical arrays with cells of different thicknesses.
Figure 3:
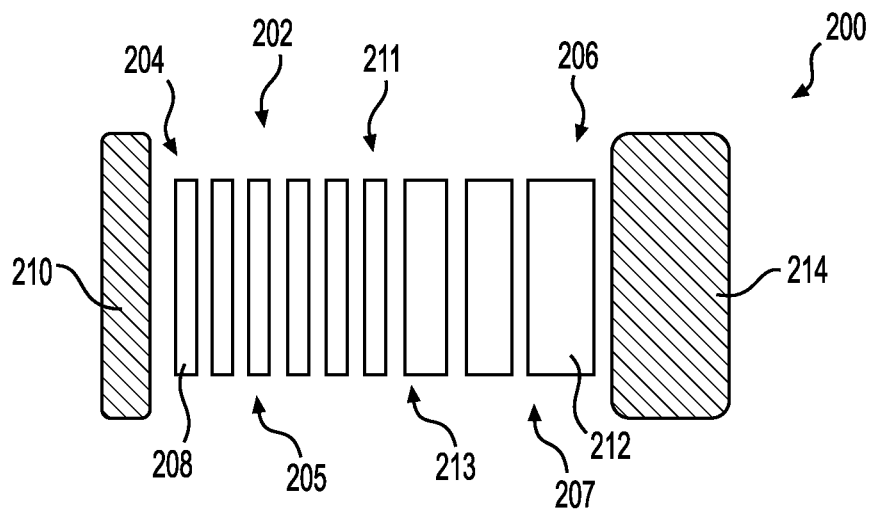

Referring to FIGS. 2-5, each array 200 may include electrochemical cells 202 of different sizes and/or thicknesses. Hereinafter, this description will refer to thicknesses however it should be understood that sizes and/or thicknesses are embodied by this disclosure. In a variation, the cells 202 of the array 200 may form a gradient where the thickness of each proceeding cell increases and/or decreases. In a refinement, the thickness of each proceeding cell may increase or decrease from a first end 204 to a second end 206 such that it forms an asymmetry or asymmetric array, as shown in FIGS. 2-3. For example, a gradient may be formed by thinner cells at the first end 204 that incrementally increase in thickness as they become further from the first end 204 and closer to the second end 206 such that the thinnest cell 208 is proximate and/or adjacent the first endplate 210 and the thickest cell 212 is proximate and/or adjacent the second endplate 214.

In a variation, the first and second endplates 210, 214 may have different thicknesses. For example, as shown in FIG. 2, a thicker endplate (e.g., the first endplate 210) may be proximate and/or adjacent the thinner cells and a thinner endplate (e.g., the second endplate 214) may be proximate and/or adjacent the thicker cells 207.

Alternatively, as shown in FIG. 3, the thinner endplate (e.g., the first endplate 210) may be proximate and/or adjacent the thinner cells and the thicker endplate (e.g., the second endplate 214) may be proximate and/or adjacent the thicker cells 207. In yet another embodiment, the endplates 210, 214 may have the same thickness (i.e., within manufacturing tolerance), as shown in FIGS. 4-5.

Figure 4:
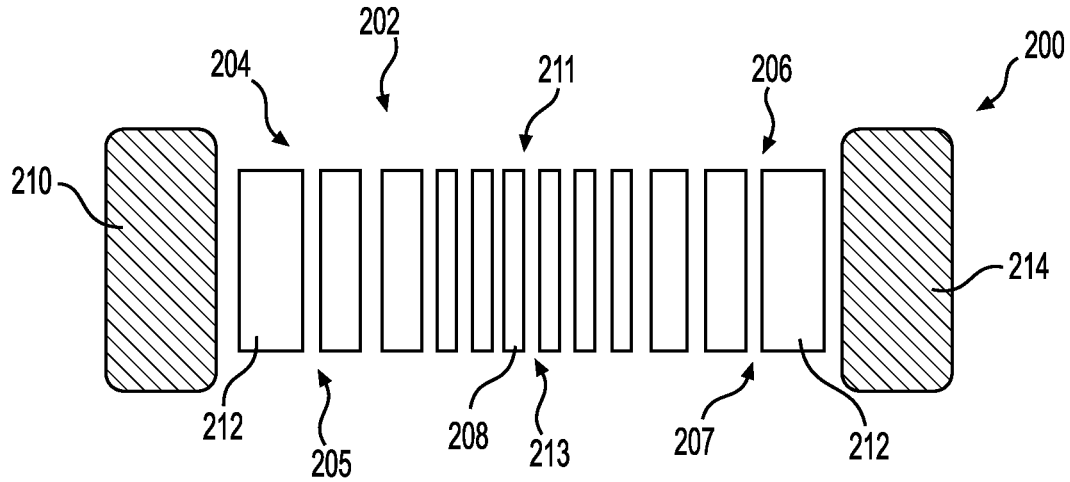
Figure 5:
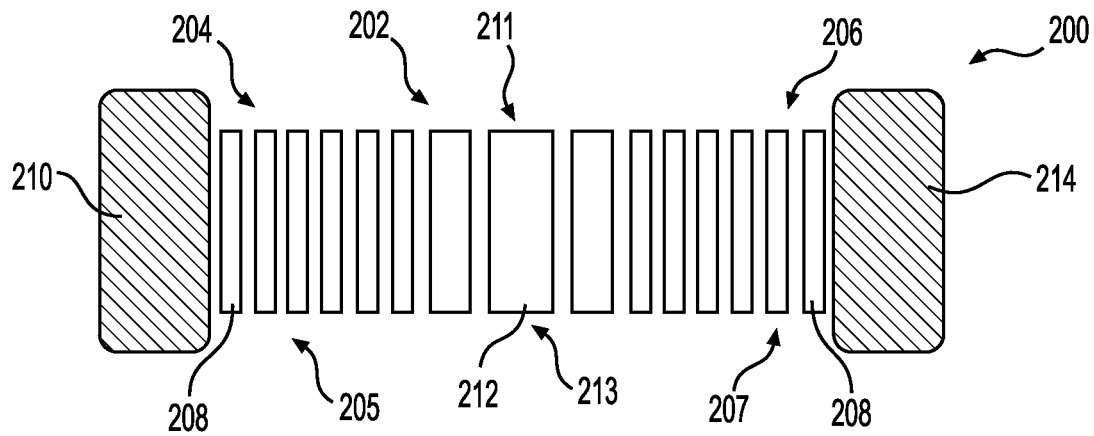

In yet another refinement, the gradient may occur from the center 211 to the ends 204, 206 or from the ends 204, 206 to the center 211 such that it creates a symmetry or symmetric array, as shown in FIGS. 4-5. For example, the center cells 213 or center most cell may be the thinnest, as shown in FIG. 4, and the outer cells 205, 207 or outer most cells (i.e., cells closest to the first and second ends 204, 206) may be the thickest. Alternatively, the center cells 213 or center most cell may be the thickest, as shown in FIG. 5, and the outer cells 205, 207 or outer most cells (i.e., cells closest to the first and second ends 204, 206) may be the thinnest.

In a refinement, the thickest cell(s) may be at least 10 mm, or more preferably 12 mm, or even more preferably 14 mm. For example, the thickest cell(s) may be 10 to 20 mm, or more preferably 11 to 16 mm, or even more preferably 12 to 15 mm. The thinnest cell(s) may be no more than 10 mm, or more preferably 8 mm, or even more preferably 6 mm. For example, the thinnest cell(s) may be 0.1 to 10 mm, or more preferably 3 to 9 mm, or even more preferably 5 to 8 mm. In one or more embodiments, the thickness of thickest cell may be at least 110% the thickness of the thinnest cell, or more preferably at least 125%, or even more preferably 150%.

In a variation, the array 200 may include a first cell 201 having a first thickness and a second cell 203 having a second thickness. In a refinement, the first and second thicknesses may be different. For example, the first thickness may be thicker than the second thickness. In another embodiment, the first thickness may be thinner than the second thickness. In a variation, the first cell may be an outer cell or the outermost cell (i.e., the first cell may be proximate or adjacent to the first or second endplate) and the second cell may be in the center or the center most cell (i.e., the second cell may be the furthest from the endplates.

In another variation, the array 200 may include third cell. The third cell may have a thickness that is different than the first and/or second cell. In a refinement, the third cell may have a third thickness that is greater than or less than the first and/or second thicknesses. For example, the third thickness may be greater than or less than the second thickness. In a variation, the first and third thicknesses may be the same or generally the same (i.e., within manufacturing tolerances).

In still another variation, the third thickness may be thicker (i.e., greater) than the second thickness which may be thicker than the first thickness. Alternatively, the third thickness may be thinner (i.e., less) than the second thickness which may be thinner than the first thickness.

Figure 6:
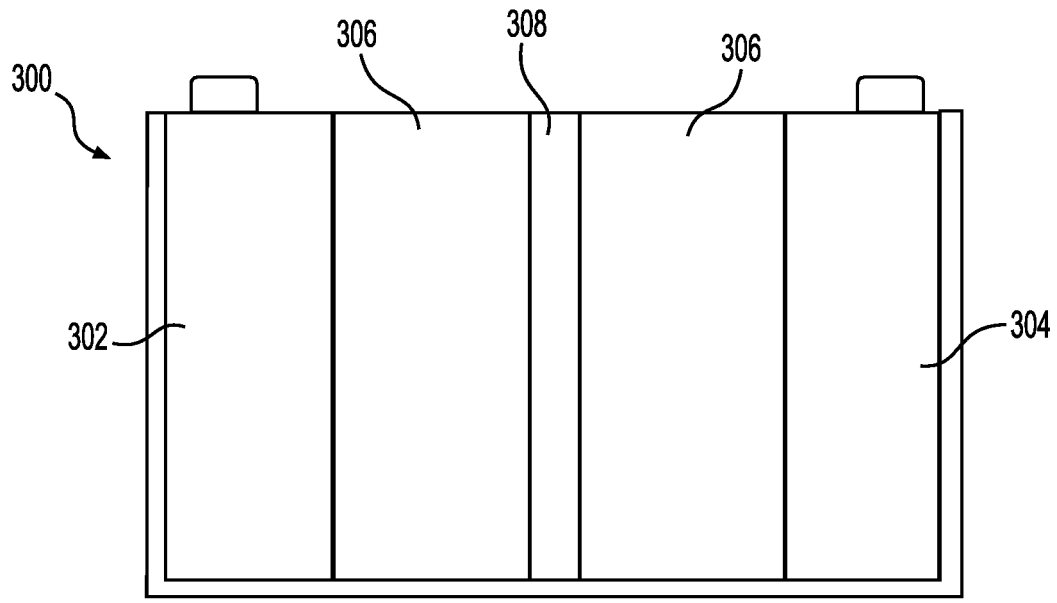
FIG. 6 is an electrochemical cell.

Referring to FIG. 6, each electrochemical cell 300 may include a pair of electrodes such as a cathode 302 and an anode 304 with an electrolyte 306 in contact which the pair of electrodes. The electrochemical cell 300 may further include a current collector and/or a separator 308.

The electrochemical cells 300 may be a lithium-ion batteries (LIBs). For example, the electrode may be made of a metal salts such as metal oxides, a lithium metal salts such as lithium metal oxides and/or graphite, and the electrolyte may be any suitable material for transporting lithium ions in a redox reactions such as a salt solution, solid electrolyte, and/or polymer electrolyte. A suitable salt solution may include a solvent such as an organic solvent and a lithium salt. In a refinement, a polar solvent such as ethylene carbonate (EC), dimethyl carbonate (DMC), diethyl carbonate (DEC), ethyl methyl carbonate (EMC), and propylene carbonate (PC) or a combination thereof may be suitable. A suitable a lithium salt may be hexafluorophosphate ($LiPF_6$), $LiPF_3(C_2F_5)_3$, $LiAsF_6$, $LiClO_4$, $LiBF_4$, $LiSO_3CF_3$, $LiN(SO_2CF_3)_2$, $LiC(SO_2CF_3)_3$, LiBETI, $LiBC_4O_8$, LiBOB, LiFAP, LiODFB, LiTFSI or a combination thereof.

In one or more embodiments, the electrochemical cell 300 may be an assembly of layers such as but not limited a cathode layer, electrolyte layer, separator layer, electrolyte layer and an anode layer.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electrochemical cell array comprising:
a pair of endplates having a same thickness; and
a plurality of electrochemical cells including a first cell having a first thickness, a second cell having a second thickness greater than the first thickness, and a third cell having a third thickness greater than the second thickness, the plurality of electrochemical cells being arranged to form a stack between and compressed by the pair of endplates such that the first cell is proximate a first endplate of the pair of endplates, the second cell is proximate a center of the stack, and the third cell is proximate a second endplate of the pair of endplates.

2. The electrochemical cell array of claim 1, wherein thicknesses of the electrochemical cells along the stack are asymmetric relative to a center of the stack.

3. The electrochemical cell array of claim 1, wherein the plurality of electrochemical cells includes at least 40 cells.

4. The electrochemical cell array of claim 1, wherein the plurality of electrochemical cells includes a lithium-ion battery.

5. An electrochemical cell array comprising:
a pair of endplates having different thicknesses, a thinner endplate of the pair of endplates being disposed at a first end; and
a plurality of electrochemical cells arranged between and compressed by the pair of endplates to form a stack having a first end and a second end, the plurality of electrochemical cells including a first cell having a first thickness, a second cell having a second thickness different than the first thickness, the first cell being proximate the first end of the stack and one of the pair of endplates and the second cell being proximate to a center of the stack.

6. The electrochemical cell array of claim 5, wherein thicknesses of the electrochemical cells along the stack increase from the first end of the stack to the second end of the stack.

7. The electrochemical cell array of claim 5, wherein the first thickness is greater than the second thickness.

8. The electrochemical cell array of claim 5, wherein the second thickness is greater than the first thickness.

9. The electrochemical cell array of claim 5, wherein the plurality of electrochemical cells includes a third cell proximate the second end of the stack and the other one of the pair of endplates, the first cell having generally the same thickness as the third cell.

10. The electrochemical cell array of claim 5, wherein the plurality of electrochemical cells includes a third cell proximate the second end of the stack and the other one of the pair of endplates, the third cell having a thickness that is greater than the second thickness that is greater than the first thickness.

11. An electrochemical cell array comprising:
a pair of endplates having different thicknesses, a thicker endplate of the pair of endplate being disposed at a first end; and
a plurality of electrochemical cells arranged between and compressed by the pair of endplates to form a stack having a first end and a second end, the plurality of electrochemical cells including a first cell having a first thickness, a second cell having a second thickness different than the first thickness, the first cell being proximate the first end of the stack and one of the pair of endplates and the second cell being proximate to a center of the stack.

12. The electrochemical cell array of claim 11, wherein thicknesses of the electrochemical cells along the stack increase from the first end of the stack to the second end of the stack.

13. The electrochemical cell array of claim 11, wherein the first thickness is greater than the second thickness.

14. The electrochemical cell array of claim 11, wherein the second thickness is greater than the first thickness.

15. The electrochemical cell array of claim 5, wherein the plurality of electrochemical cells includes a third cell proximate the second end of the stack and the other one of the pair of endplates, the first cell having generally the same thickness as the third cell.

16. The electrochemical cell array of claim 5, wherein the plurality of electrochemical cells includes a third cell proximate the second end of the stack and the other one of the pair of endplates, the third cell having a thickness that is greater than the second thickness that is greater than the first thickness.

* * * * *